105.3

W. T. HANNA.

MECHANICAL STOKER.

APPLICATION FILED MAY 9, 1913.

Reissued Aug. 8, 1916.

14,179.

2 SHEETS—SHEET 1.

WITNESSES

J. R. Keller

John F. Hill

INVENTOR

William T. Hanna by Ralph C. Powell

Atty.

THE NORRIS PETERS CO. PHOTO-LITHO. WASHINGTON, D. C.

105.5

W. T. HANNA.

MECHANICAL STOKER.

APPLICATION FILED MAY 9, 1913.

Reissued Aug. 8, 1916.

14,179.

2 SHEETS—SHEET 2.

WITNESSES

J. R. Keller

John F. Hill

INVENTOR

William T. Hanna by Ralph C. Parrell

Atty

THE NORRIS PETERS CO., PHOTO-LITHO., WASHINGTON, D. C.

/0. FURNACES.

105.5

UNITED STATES PATENT OFFICE.

WILLIAM T. HANNA, OF CINCINNATI, OHIO, ASSIGNOR, BY MESNE ASSIGNMENTS, TO THE MECHANICAL CONSTRUCTION COMPANY, OF CINCINNATI, OHIO, A CORPORATION OF OHIO.

MECHANICAL STOKER.

14,179. Specification of Reissued Letters Patent. Reissued Aug. 8, 1916.

Original No. 991,614, dated May 9, 1911. Serial No. 548,945. Application for reissue filed May 9, 1913. Serial No. 766,634.

*To all whom it may concern:*

Be it known that I, WILLIAM T. HANNA, a citizen of the United States, residing at Cincinnati, in the county of Hamilton and State of Ohio, have invented certain new and useful Improvements in Mechanical Stokers, of which the following is a specification.

My invention relates to that class of stokers in which a feed plate, with guide-wings adapted to oscillate thereon, is employed for mechanically directing the flow of the fuel as it enters the furnace from the fuel conduit, and the object of the invention is to provide improved means for actuating the guide-wings.

My invention consists in the parts and combination and arrangements of parts hereinafter described and claimed.

I have described my invention as applied to a blast-feed locomotive stoker, but showing only so much of the stoker construction as will suffice to show the connection of the invention therewith.

Figure 1:
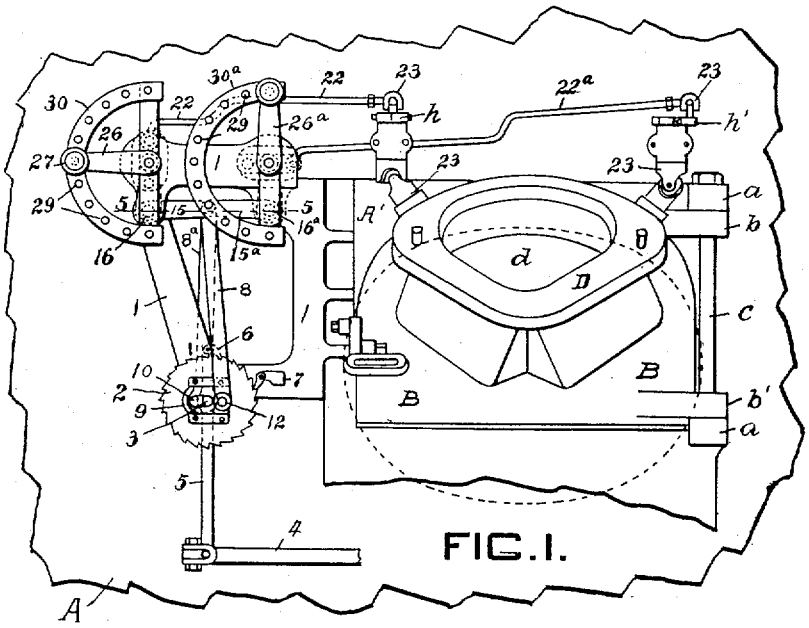
Figure 2:
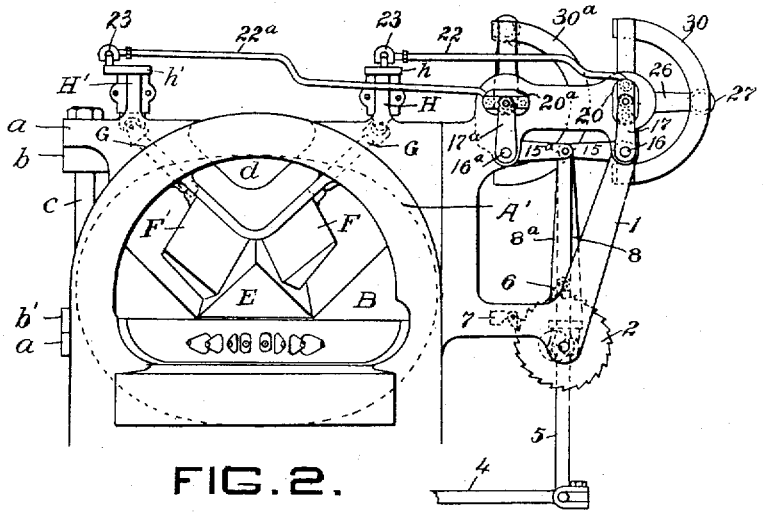
Figure 3:
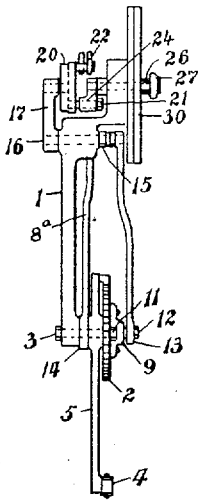
Figure 4:
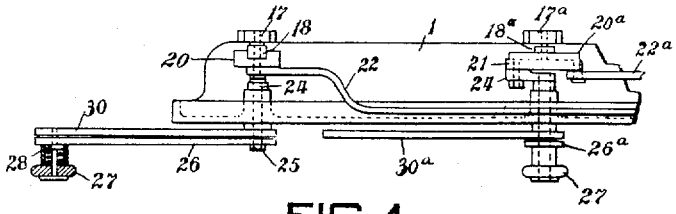
Figure 5:
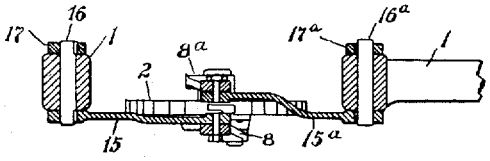
Figure 6:
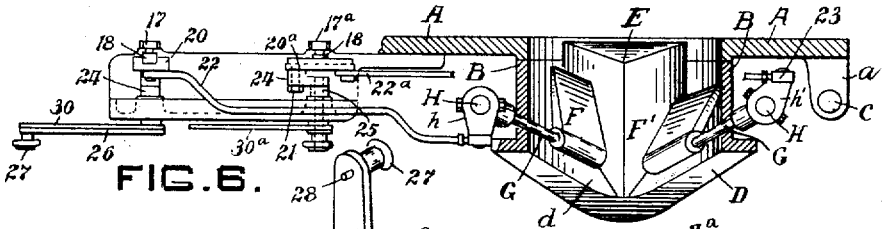
Figure 7:
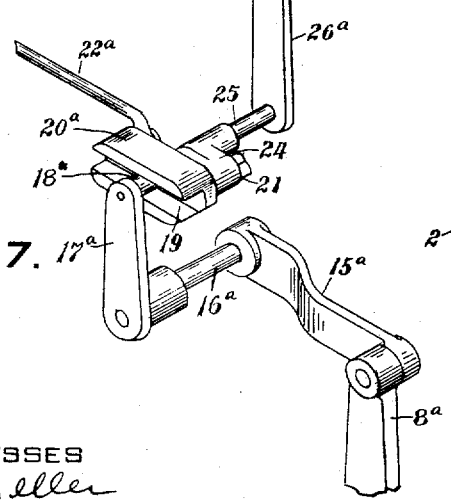
Figure 8:
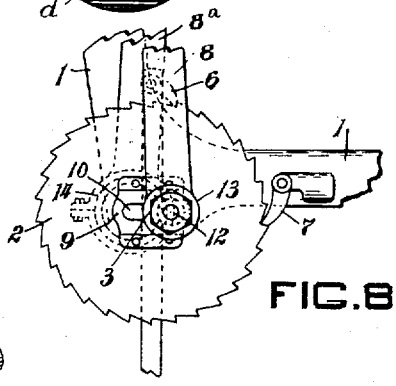

In the drawings, Figure 1 is a front elevation of a portion of the fire front of a locomotive furnace equipped with my invention; Fig. 2 is a rear elevation of the same; Fig. 3 a side elevation of the guide-wing actuating mechanism; Fig. 4 an enlarged plan view of a portion of the same; Fig. 5 is a section on the line 5—5 of Fig. 1; Fig. 6 is a plan view including the fire door frame; Fig. 7 a skeleton perspective view showing the relationship of certain of the operating parts; and Fig. 8 an enlarged detail of a ratchet wheel and the connecting parts.

A designates the furnace front, A′ the fire door frame the usual fuel opening being indicated in dotted lines, B the fire door, *a* hinge knuckles on the door frame, *b* hinge knuckles on the door, C the hinge pintle, D a plate secured to the fire door to which the fuel conduit may be attached and provided with an opening *d* through which fuel may pass from the fuel conduit to the interior of the furnace, and E a feed plate projecting within the door opening. The feed plate is preferably angular in cross section with its upper faces forming a ridge like that of a pitch roof, and the plate preferably slopes downwardly from the feed to the discharge end.

F, F′, are guide wings, preferably in the form of rectangular plates, mounted at their rear ends upon pivot shafts G, G′, in such manner that, by rocking the pivot shafts, the guide wings may be swung upwardly and downwardly upon the upper faces of the feed plate.

H, H′, are rock shafts mounted in brackets, projecting from the door frame, and having a jointed connection with the guide wing pivot shafts and provided with crank arms *h* and *h′* whereby they may be rocked.

Feed plates and guide wings of the same general type are disclosed in my pending applications, Serial Numbers 282,142, filed October 10, 1905, and 383,908, filed May 16, 1907, and the parts thus far described, except as elements in new combinations, constitute no part of the present invention.

The reference numeral 1 indicates a bracket extending from the door frame, 2 a ratchet wheel loosely mounted upon a pivot shaft 3 mounted in bracket 1, 4 a bar adapted to be reciprocated by any suitable connection with the stoker engine (not shown) 5 a lever pivotally connected with bar 4, fulcrumed on pivot shaft 3 and carrying a pallet 6 adapted to engage with the teeth of the ratchet wheel and to actuate the wheel, 7 a weighted pawl adapted to prevent reverse movement of the ratchet wheel and to retard its direct action; and 8 and $8^a$ arms eccentrically connected with the ratchet wheel. I prefer to mount one of the eccentric arms in such manner that its bearing may be readily shifted relatively to the axis of the ratchet wheel. In the form shown 9 is a plate fixed to the ratchet wheel and provided with a slot 10 extending across the axis thereof and with a recess 11 to receive the head of a bolt 12, carrying a disk 13 upon which the eccentric arm 8 is loosely mounted. The bolt may be secured in either end of the slot by screwing up the nut which also clamps the disk in a fixed position. The other arm $8^a$ is mounted upon a cam 14. By changing the position of the bolt, which serves as the eccentric shaft of arm 8, from one end of slot 10 to the other end, the direction of motion of arm 8 relatively to that of arm 8ª may be reversed. At their free ends, the eccentric arms are pivotally connected with cranks, 15 and 15ª, adapted to actuate rock shafts 16 and 16ª mounted in bracket 1. To the other ends of the rock shafts are fixed cranks, 17 and 17ª, carrying upon their wrist pins rollers, 18 adapted to travel in grooves 19 in levers 20 and 20ª. These levers are fulcrumed at one end upon pivot bolts 21, and are pivotally connected at their other ends to rods 22 and 22ª which are connected by universal joints 23 with the cranks *h* and *h'* which actuate the guide wing rock shaft. The pivot bolts 21 are carried by cranks 24 fixed to pivot shafts 25 mounted in the bracket and adapted to be actuated by hand bars 26 and 26ª. The hand bars carry at their free ends, knobs 27 having spring pins 28 adapted to take into selected holes in series of holes 29 arranged in the arc of a circle in segmental plates 30 and 30ª.

It should be noted that the arcs of travel of the rollers 18 are fixed, that the cranks 17 and 17ª carrying the rollers are positively driven and are adapted to actuate the levers, and that the positions of the pivot bolts 21, which serve as fulcrums for the levers, may be changed, relatively to the arcs of travel of the rollers, by means of the hand bars acting through pivot shafts 25 and cranks 24. The action of the levers upon the guide wings actuating rods is therefore largely dependent upon the position of the lever fulcrums relatively to the arc of travel of the rollers. I have illustrated hand bar 26 as extending horizontally and secured midway of the segmental plate. This positions the fulcrum of lever 20 in the same vertical plane with roller 18 when the latter is in the center of its arc of travel and the lever will be actuated through its entire possible sweep and thereby cause guide wing F to be oscillated through its entire sweep. I have illustrated hand bar 26ª as extending vertically with its knob end upward. This positions the fulcrum of lever 20ª in substantially the same horizontal plane with roller 18ª and the roller will ride in the groove without imparting any substantial movement to the lever. With the lever in this position guide wing F' will be stationary at the bottom of its sweep. Reversing the position of the hand bar would reverse the position of lever 20ª and the guide wing would be stationary at the top of its sweep. By positioning the hand bar at any angle between the vertical and the horizontal upon the upper half of the segmental plate the guide wing may be caused to oscillate to and fro from its low position through any desired part of its possible sweep. By positioning the hand bar at any angle between the lower half of the segmental plate the guide wing may be caused to oscillate to and fro from its high position through any desired part of its possible sweep. With both guide wings oscillating through their entire sweep, the fuel is discharged with practical uniformity from the entire width of the feed plate. With both guide wings stationary at the bottom of their sweep the fuel is delivered from the outer edge of the plate on both sides. With one guide wing stationary at the top and the other stationary at the bottom, the feed is delivered at one edge only. With one guide wing stationary at the top and the other oscillating through its entire sweep the feed is distributed with practical uniformity from one side to the center line of the plate.

The operation is as follows: Bar 4 is reciprocated and imparts movement to lever 5 which, through pallet 6, actuates the ratchet wheel 2. Movement of the ratchet wheel imparts movement to the eccentric arms, 8 and 8ª, which, through cranks 15 and 15ª, rock shafts 16 and 16ª and the roller carrying cranks 17 and 17ª cause the rollers 18 and 18ª to travel in the grooves 19 and 19ª in the levers 20 and 20ª. The pivot bolts 21 and 21ª being positioned as shown in the drawings, roller 18 will rock lever 20 to and fro and movement of the lever will reciprocate rod 22 which, acting through crank *h*, rock shaft H and pivot shaft G, will cause guide wing F to be oscillated through its entire sweep. Roller 18ª will impart no effective movement to lever 20ª and guide wing F' will be practically stationary at the bottom of its sweep. By positioning hand bar 26ª so that its position will correspond with that of hand bar 26, both levers will be actuated to their full extent and both guide wings will be actuated through their full sweep. By positioning the hand bars at other angles the guide wings may be actuated from top or bottom through any desired positions of their full sweep and either may be actuated through one portion of its sweep while the other is actuated through a different portion. By changing the position of bolt 12 from the position shown to the other of slot 10 in plate 9 the eccentric arm 8 may be caused to move upward and travel of the feed plates will then be in reverse direction.

While I have illustrated the feed plate as angular in cross section, any desired form may be used without departing from the spirit of my invention.

I claim as my invention:

1. The combination with a furnace door casing of a bracket; a feed plate; guide wings adapted to oscillate thereon; rods intermediately connected with and adapted to actuate the guide wings; a ratchet wheel pivotally mounted on the bracket; means for actuating the ratchet wheel; arms eccentrically connected with the ratchet wheel; and connections between the eccentric arms and the guide wing actuating rods whereby the latter may be actuated.

2. The combination with a furnace door casing of a bracket; a feed plate; guide wings adapted to oscillate thereon; rods intermediately connected with and adapted to actuate the guide wings; a ratchet wheel pivotally mounted on the bracket; means for actuating the ratchet wheel; arms eccentrically connected with the ratchet wheel; crank connections between the eccentric arms and the guide wing actuating rods whereby the latter may be actuated; and means for adjusting the throw of the cranks.

3. The combination with a furnace door casing of a bracket; a feed plate; guide wings adapted to oscillate thereon; rods intermediately connected with and adapted to actuate the guide wings; a ratchet wheel pivotally mounted on the bracket; means for actuating the ratchet wheel; arms eccentrically connected with the ratchet wheel; crank connections between the eccentric arms and the guide wing actuating rods whereby the latter may be actuated; and means for adjusting the throw of the cranks independently of each other.

4. The combination with a furnace door casing of a bracket; a feed plate; guide wings adapted to oscillate on the feed plate; pivot shafts adapted to actuate the guide wings; rock shafts adapted to actuate the pivot shafts; rods adapted to actuate the rock shafts; a ratchet wheel pivotally mounted upon the bracket; a reciprocating arm; a lever arm pivotally connected therewith; a pallet carried by the lever arm adapted to actuate the ratchet wheel; arms eccentrically connected with the ratchet wheel; and connections between the eccentric arms and the rods which actuate the guide-wing rock shafts whereby the latter may be actuated.

5. The combination with a furnace door casing of a bracket; a feed plate; guide wings adapted to oscillate on the feed plate; pivot shafts adapted to actuate the guide wings; rock shafts adapted to actuate the pivot shafts; rods adapted to actuate the rock shafts; a ratchet wheel pivotally mounted upon the bracket; a reciprocating arm; a lever arm pivotally connected therewith; a pallet carried by the lever arm adapted to actuate the ratchet wheel; arms eccentrically connected with the ratchet wheel; crank connections between the eccentric arms and the rods which actuate the guide wing rock shafts whereby the latter may be actuated; and means for adjusting the throw of the cranks.

6. The combination with a furnace door casing of a bracket; a feed plate; guide wings adapted to oscillate on the feed plate; pivot shafts adapted to actuate the guide wings; rock shafts adapted to actuate the pivot shafts; rods adapted to actuate the rock shafts; a ratchet wheel pivotally mounted upon the bracket; a reciprocating arm; a lever arm pivotally connected therewith; a pallet carried by the lever arm adapted to actuate the ratchet wheel; arms eccentrically connected with the ratchet wheel; crank connections between the eccentric arms and the rods which actuate the guide wing rock shafts whereby the latter may be actuated; and means for adjusting the throw of the cranks independently of each other.

7. The combination with a furnace door casing of a bracket; a feed plate; guide wings adapted to oscillate thereon; rods intermediately connected with and adapted to actuate the guide wings; a ratchet wheel pivotally mounted on the bracket; means for actuating the ratchet wheel; arms eccentrically connected with the ratchet wheel; cranks pivotally connected with the eccentric arms; rock shafts adapted to be actuated by the cranks; cranks fixed to the driving ends of the rock shafts; rollers carried by the wrist pins of the cranks; and levers having grooves adapted to receive the rollers; the levers being fulcrumed at one end and pivotally connected at the other end with the guide wing actuating arms.

8. The combination with a furnace door casing of a bracket; a feed plate; guide wings adapted to oscillate thereon; rods intermediately connected with and adapted to actuate the guide wings; a ratchet wheel pivotally mounted on the bracket; means for actuating the ratchet wheel; arms eccentrically connected with the ratchet wheel; cranks pivotally connected with the eccentric arms; rock shafts adapted to be actuated by the cranks; cranks fixed to the driving ends of the rock shafts; rollers carried by the wrist pins of the cranks; levers having grooves adapted to receive the rollers, the levers being fulcrumed at one end and pivotally connected at the other end with the guide wing actuating rods; and means for changing the position of the fulcrum of the levers relatively to the arcs of travel of the rollers.

9. The combination with a furnace door casing of a bracket; a feed plate; guide wings adapted to oscillate thereon; rods intermediately connected with and adapted to actuate the guide wings; a ratchet wheel pivotally mounted on the bracket; means for actuating the ratchet wheel; arms eccentrically connected with the ratchet wheel; cranks pivotally connected with the eccentric arms; rock shafts adapted to be actuated by the cranks; cranks fixed to the driving ends of the rock shafts; rollers carried by the wrist pins of the cranks; pivot shafts mounted in the bracket, hand bars fixed to the pivots; cranks carried by the pivot shafts; pivot bolts carried by the cranks; levers fulcrumed at one end on the pivot bolts and pivotally connected at the other end with the guide wing actuating rods and having grooves adapted to receive the rollers, and means for securing the hand bars in selected positions.

10. The combination with a furnace door casing of a bracket; a feed plate; guide wings adapted to oscillate thereon; rods intermediately connected with and adapted to actuate the guide wings; a ratchet wheel pivotally mounted on the bracket; means for actuating the ratchet wheel; arms eccentrically connected with the ratchet wheel; means for changing the position of the eccentric axis for one of the arms relatively to that of the other arm; and connections between the eccentric arms and the guide wing actuating rods whereby the latter may be actuated.

11. The combination with a furnace door casing of a bracket; a feed plate; guide wings adapted to oscillate thereon; rods intermediately connected with and adapted to actuate the guide wings; a ratchet wheel pivotally mounted on the bracket; means for actuating the ratchet wheel; a plate secured to the ratchet wheel and having a slot extending across the center thereof; a bolt adapted to be secured in either end of the slot; a disk carried by the bolt; an arm loosely mounted thereon; another arm concentrically connected with the ratchet wheel; and connections between the arms and the guide wing actuating rods whereby the latter may be actuated.

12. In a fuel distributing apparatus, the combination with a feed chute and an oscillatory guide member, of an oscillatory actuating member connected with said guide member, means for actuating said oscillatory actuating member, means for shifting the center of oscillation of said oscillatory actuating member with respect to said actuating means whereby the range of movement of said guide member may be varied.

13. In a fuel distributing apparatus, the combination with a delivery chute and an oscillatory guide member, of an oscillatory actuating member connected therewith, an actuating crank arm for actuating said oscillatory actuating member, means for shifting the center of oscillation of said oscillatory actuating member with respect to the center of oscillation of said crank arm whereby the range of movement of said oscillating guide member may be varied.

14. In a fuel distributing apparatus, the combination with a delivery chute and an oscillatory guide member therein, of an oscillatory actuating member connecting with said guide member, a shiftable pivot for said actuating member, said actuating member having a cam-way, an actuating crank arm having a wrist pin engaging said cam-way, means for shifting the center of oscillation of said actuating member with respect to the center of oscillation of said crank arm whereby the range of movement of said guide member may be varied.

15. In a fuel distributing apparatus, the combination with a delivery chute and an oscillatory guide member therein, of an actuating lever connected at one end with said guide member, said actuating lever being pivoted at its opposite end upon a shiftable center of oscillation, said lever having a cam-way, an actuating crank arm having a wrist pin engaging said cam-way, and means for shifting the center of oscillation of said actuating lever with respect to said wrist pin to vary the range of oscillation of said lever and thereby vary the range of movement of said guide member.

16. In a fuel distributing apparatus, the combination of a delivery chute and an oscillatory guide member therein, of an oscillatory actuating member connected with said guide member, a crank arm mounted on a fixed pivot the free end of said arm being pivotally connected with said oscillatory actuating member eccentrically of said connection with the guide member, whereby the center of oscillation of said actuating member may be varied with respect to said connection to vary the range of movement of said guide member, and an actuating crank arm having a fixed pivot and having its free end engaging with said actuating member to oscillate the same.

17. In a distributing apparatus, the combination with a delivery chute and an oscillatory guide member mounted therein, of an oscillatory actuating member pivotally connected with said guide member, a shiftable center of oscillation for said actuating member, a cam-way extending radially from said center of oscillation, an actuating crank arm having a fixed pivot and having a wrist pin engaging said cam-way whereby when the center of oscillation of said actuating member is shifted the position of said cam-way with respect to said wrist pin will be correspondingly shifted to vary the oscillatory effect of said wrist pin upon said actuating member.

18. In a distributing apparatus the combination with a delivery chute and a guide member mounted therein, of an oscillatory actuating member connected with said guide member eccentrically with respect to the center of oscillation of said actuating member, means for shifting the center of oscillation of said actuating member with respect to said connection, said actuating member having a cam-way extending radially from its

110. FURNACES.

105.5 center of oscillation and means for actuating said actuating member, the shifting of the center of oscillation of said actuating member serving to shift the point of application of said actuating means with respect to the center of oscillation of said actuating member whereby the range of oscillation of said actuating member may be varied for a constant range of movement of said actuating means.

WILLIAM T. HANNA.

Witnesses:
CLARA STANNUS,
J. WM. JOHNSON.

Copies of this patent may be obtained for five cents each, by addressing the "Commissioner of Patents, Washington, D. C."